United States Patent

[11] 3,607,213

| [72] | Inventors | Schroeder Jerzy<br>Wroclaw;<br>Zielinski Stefan, Wroclaw; Dziadur Janusz, Kwaczala; Luty Stanislaw, Kwaczala; Czunko Adam, Chrzanow; Synowiec Jerzy, Gliwice, all of, Poland |
|---|---|---|
| [21] | Appl. No. | 771,606 |
| [22] | Filed | Oct. 29, 1968 |
| [45] | Patented | Sept. 21, 1971 |
| [73] | Assignee | Zaklady Chemiczne<br>Alwernia, Poland |
| [32] | Priority | Nov. 2, 1967 |
| [33] | | Poland |
| [31] | | P123361 |

[54] PROCESS OF PRODUCING CONCENTRATED POTASSIUM-CALCIUM PHOSPHATIC FERTILIZER
1 Claim, No Drawings

[52] U.S. Cl................................................... 71/33,
23/107, 23/108, 71/34, 71/41, 71/43
[51] Int. Cl. .......................................... C05b 11/10,
C05b 7/00
[50] Field of Search............................................ 71/33, 34,
41, 43; 23/107, 108

[56] References Cited
UNITED STATES PATENTS

| Re.25,455 | 10/1963 | Lobdell | 71/34 X |
|---|---|---|---|
| 2,036,760 | 4/1936 | Knox | 71/41 X |
| 2,067,538 | 1/1937 | MacIntire | 71/41 X |
| 2,173,826 | 9/1939 | Curtis | 23/108 |
| 2,288,418 | 6/1942 | Partridge | 71/34 X |
| 2,874,027 | 2/1959 | Gloss | 23/107 |

*Primary Examiner*—Reuben Friedman
*Assistant Examiner*—Bennett H. Levenson
*Attorney*—Irvin A. Lavine

ABSTRACT: Process of producing potassiumphosphatic fertilizer comprising reacting potassium chloride with phosphoric acid in amount of about 35–55 percent by weight of excess over a stoichiometric amount at 120°–350° C. and neutralizing the excess phosphoric acid with calcium oxide at the same temperature. The neutralization product is melted at 750°–1000° C. and fast cooled to ambient temperature. The fertilizer obtained is fully water-soluble and nonhygroscopic.

PROCESS OF PRODUCING CONCENTRATED POTASSIUM-CALCIUM PHOSPHATIC FERTILIZER

The invention relates to the production of concentrated potassium phosphatic fertilizer, in particular potassium calcium polyphosphate obtained from potassium chloride, phosphoric acid and calcium oxide.

The known process of producing concentrated potassium phosphatic fertilizer is based on the reaction of potassium chloride with phosphoric acid in equimolar quantities.

The reaction is carried out in one stage at a temperature in the range of 300°–600° C. or in two stages wherein in the first stage potassium chloride is decomposed with phosphoric acid at temperatures ranging up to 300° C., and in the second stage the decomposition products are melted at temperatures above 800° C.

In this manner crystalline potassium polyphosphate having a formula $/KPO_3/_n$ is obtained. The said product is practically insoluble in water and in 2 percent citric acid.

The fast cooling of a liquid melt with an air stream or on metallic rolls provides a product which is only partly water soluble and which is hygroscopic. This last property disadvantageously affects the quality of the obtained product in transport, storage and application.

As a result of research works concerning polyphosphates it was found that potassium-calcium polyphosphates could be obtained with properties which surpass all potassium phosphatic fertilizers formerly known and used.

The said fertilizers are fully water soluble nonhydroscopic, and have a content of active components ranging up to 91.5 percent.

The subject of the invention consists in producing concentrated potassium phosphatic fertilizer, in particular potassium-calcium polyphosphate by chemical reaction of potassium chloride, phosphoric acid and calcium oxide.

The reaction of potassium chloride and excess phosphoric acid amounting to about 35–55 percent by weight calculated to 100 percent of $H_3PO_4$ that is 35–55 percent by weight more than the stoichiometric amount of phosphoric acid which reacts with potassium chloride, is carried out at the temperature in the range of 120°–350° C. After reacting with the potassium chloride, the excess of phosphoric acid is neutralized with calcium oxide at the same temperature.

Using an excess of phosphoric acid accelerates decomposition of potassium chloride and enables its complete reaction while neutralization of an excess of the said acid with calcium oxide provides circumstances for yielding potassium-calcium phosphate.

The intermediate, obtained after neutralization, is melted at the temperature in the range of 750°–1,000° C. and fast cooled on metallic rolls to ambient temperature. In this way glassy potassium-calcium phosphate is obtained with a content of 61.0 percent of $P_2O_5$, 26.0–27.8 percent of $K_2O$ and 8.5–13.0 percent of CaO which is in practice completely water soluble.

The said product obtained according to the present invention presents a high concentrated potassium phosphatic fertilizer of high hygroscopic properties, unchanged in longlasting storage, easy and operative to use.

EXAMPLE

Ten parts by weight of potassium chloride are mixed with 26.28 parts by weight of orthophosphoric acid having the 75 percent content of $H_3PO_4$. The mixture is heated to a temperature of 300° C. for a half hour. Calcium oxide is added to said reaction mixture in an amount sufficient to neutralize the excess of phosphoric acid at the same temperature. Then the obtained mass is melted at the temperature of 750°–1,000° C. and the obtained liquid melt is fast cooled on metallic rolls to the ambient temperature. The obtained glassy produce has a content of 62.7 percent $P_2O_5$ and 27.8 percent of $K_2O$ and is 99.8 percent water soluble, and is completely soluble in 2 percent citric acid.

The analysis has shown the presence of chlorides only in trace quantities.

What we claim is:

1. A process of producing concentrated potassium phosphatic fertilizer which comprises decomposing potassium chloride with phosphoric acid in an amount of about 35–55 percent by weight excess over the stoichiometric amount, at a temperature in the range of 120°–350° C., neutralizing the excess of the said acid with calcium oxide at the same temperature, melting the resultant mixture at 750°–1,000° C., and fast cooling the liquid melt to ambient temperature.